United States Patent
Huang

(10) Patent No.: US 8,622,858 B2
(45) Date of Patent: Jan. 7, 2014

(54) LEAF CHAIN

(75) Inventor: Yi-Cheng Huang, Pingtung (TW)

(73) Assignee: Ming-Chang Traffic Parts Manufacturing Co., Ltd., Pingtung County (TW)

( * ) Notice: Subject to any disclaimer, the term of this patent is extended or adjusted under 35 U.S.C. 154(b) by 970 days.

(21) Appl. No.: 12/581,111

(22) Filed: Oct. 16, 2009

(65) Prior Publication Data

US 2011/0086736 A1    Apr. 14, 2011

(51) Int. Cl.
*F16G 13/07* (2006.01)
*F16G 13/02* (2006.01)

(52) U.S. Cl.
USPC ........................................................ 474/230

(58) Field of Classification Search
USPC ............. 474/206, 226, 228, 230, 231; 75/252
See application file for complete search history.

(56) References Cited

U.S. PATENT DOCUMENTS

| | | | | | |
|---|---|---|---|---|---|
| 4,494,945 | A | * | 1/1985 | Ogino | 474/231 |
| 4,932,927 | A | * | 6/1990 | Fillar | 474/207 |
| 5,921,880 | A | * | 7/1999 | Ishimoto et al. | 474/207 |
| 7,197,959 | B2 | * | 4/2007 | Crissy | 74/574.4 |
| 2004/0058766 | A1 | * | 3/2004 | Schumacher et al. | 474/207 |
| 2007/0155563 | A1 | * | 7/2007 | Aoki | 474/206 |
| 2007/0186722 | A1 | * | 8/2007 | Hanejko | 75/252 |
| 2010/0093475 | A1 | * | 4/2010 | Miyazawa | 474/231 |
| 2010/0285912 | A1 | * | 11/2010 | Aoki | 474/228 |

* cited by examiner

*Primary Examiner* — William E Dondero
*Assistant Examiner* — Robert T Reese
(74) *Attorney, Agent, or Firm* — Rosenberg, Klein & Lee

(57) ABSTRACT

A leaf chain comprises a plurality of links connected together, each of which includes two aligned rollers, at least one first inner plate provided with apertures to pivotally receive the rollers, and two outer plates fixed to the respective rollers and respectively positioned at external sides of the first inner plate. Wherein, two spacers are respectively disposed at both peripheries of the aperture on the first inner plate and annularly disposed on the rollers so as to block a leakage of a lubricant distributed over an interstice formed between each roller and each aperture.

6 Claims, 7 Drawing Sheets

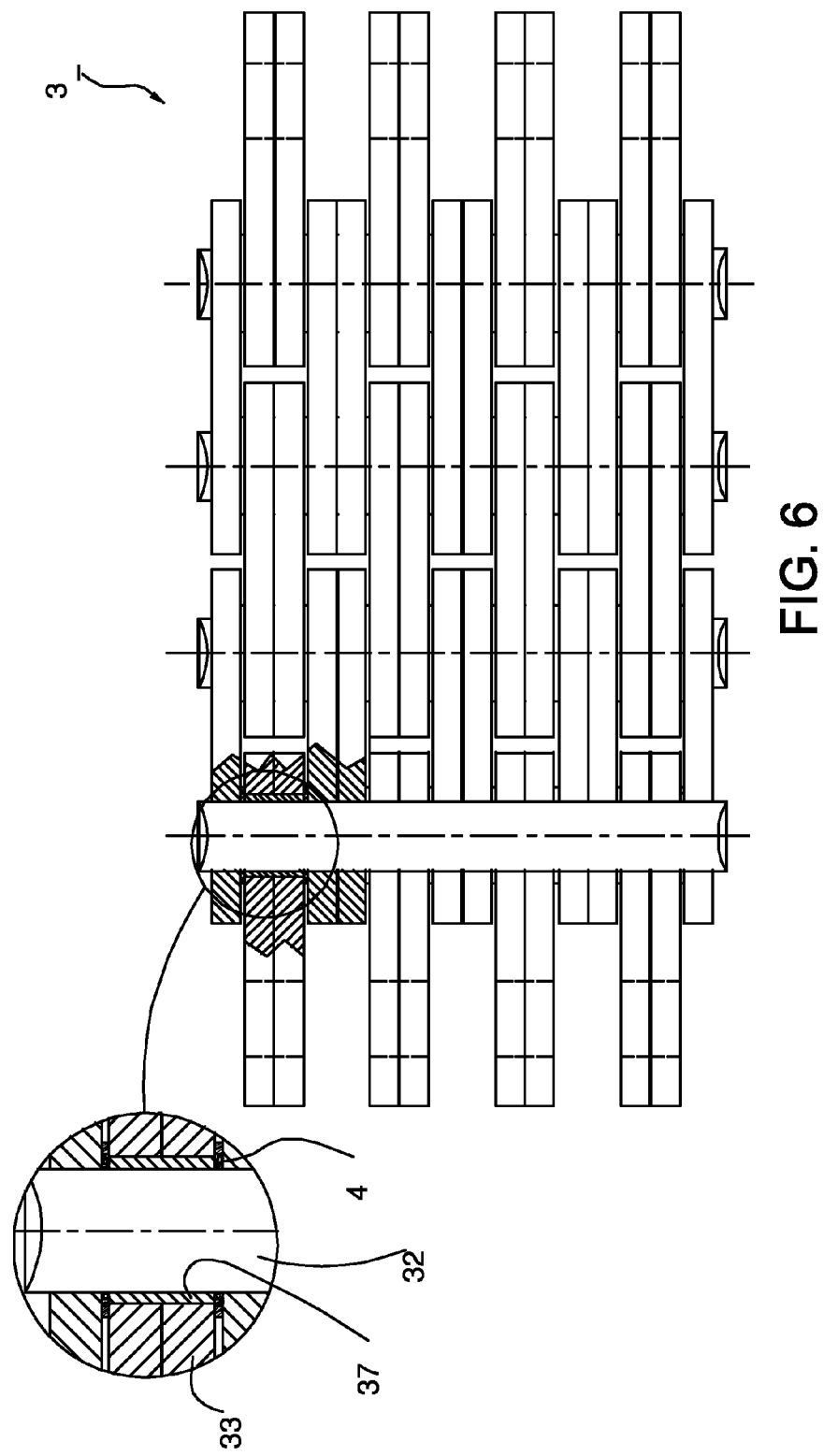

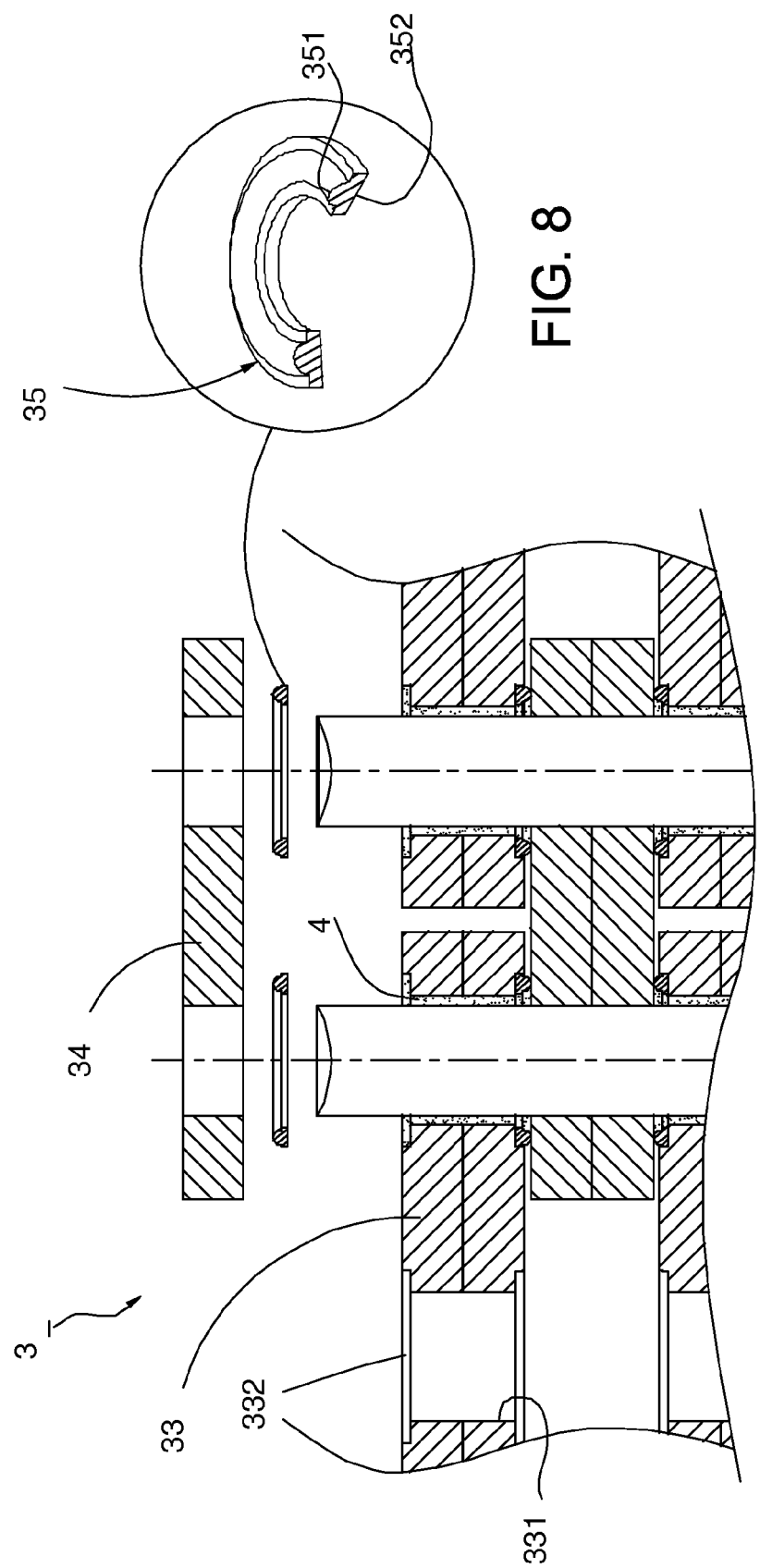

LEAF CHAIN

BACKGROUND OF THE INVENTION

1. Field of the Invention

The present invention relates to a leaf chain, particularly to a leaf chain for machinery with a high loading transmission.

2. Description of the Related Art

Generally, chains are applied to transmit dynamics. With practical applied occasions, various chains with divergent types and structures are designed. For example, the leaf chain is usually applied to the occasion that requires a high driving force, such as the machinery for transmission or for hanging weighty objects.

Referring to FIG. 1, a conventional leaf chain 1 substantially comprises a plurality of links 11 strung together. Each of the links 11 includes two aligned rollers 12, at least one first inner plate 13 pivotally disposed on the rollers 12 (four first inner plates set of lines are adopted in the illustration), a second inner plate 14 provided between any two of the first inner plates 13, and two outer plates 15 respectively fixed to the rollers 12 and positioned at external sides of the first inner plate 14. Wherein, a plurality of first and second apertures 131, 141 respectively defined on the first and the second inner plates 13, 14 would be penetrated by the rollers 12. Concurrently, a lubricant 2 is added within an interstice formed by each roller 12 and apertures 131, 141 to attain the lubricating efficiency, thereby preventing the rollers 12 and the apertures 131, 141 from abrasion and rustiness in time of operation.

However, some drawbacks exist in the conventional leaf chain 1 as follows:

1. The lubricant 2 spreads within the interstice between the first and the second apertures 131, 141 and the roller 12; namely, the lubricant 2 utilizes an inherent adhesion force thereof to fill with the interstice. However, when the leaf chain 1 is applied, components contained therein are subjected to a reciprocal abrasion, thereby resulting in a soaring temperature of the lubricant 2 to decline the adhesion force thereof. Concurrently, since the first inner plate 13, the second inner plate 14, and the outer plate 15 adopt a loose engagement, the lubricant 2 might be undesirably released out of the interstice. As a result, the lubricating efficiency adapted to the leaf chain 1 is poor, which however influences the integral transmission stability of the leaf chain 1 and increases the abrasion rate between the rollers 12, the first and the second inner plates 13, 14 to accordingly reduce the service life of the same.

2. Since the first inner plate 13 would be commonly built to a tolerance to the dimension of the aperture 131 in time of manufacturing, the contacting surface between the first inner plate 13 and the roller 12 would be somewhat uneven that unfavorably incurs a slackened engagement. Thus, when the leaf chain is operated, such slackened engagement thereof is easily subjected to collision and abrasion. A worse situation would be even brought out after the leakage of the lubricant 2.

3. A fixed engagement is merely applied between the rollers 12 and the outer plate 15. That is, the first and the second apertures 131, 141 of the first and the second inner plates 13, 14 and the rollers 12 are in a pivotal engagement. Herein, if the leaf chain 1 is applied to a high-loading operation, the rollers 12 would become rotated since a twisting force applied on the roller 12 is larger than the engaging force formed on the outer plate 15 and the rollers 12. As a result, an undesirable abrasion would be caused between the roller 12 and the outer plate 15, thence affecting the service life of the same.

SUMMARY OF THE INVENTION

Therefore, the object of the present invention is to provide a leaf chain, which facilitates to prevent the lubricant contained therein from leakage, thereby conducing to a preferable lubricating efficiency and thence extending a serve life of the leaf chain.

The leaf chain in accordance with the present invention mainly comprises a plurality of links connected together, each of which includes two aligned rollers, at least one first inner plate provided with apertures to pivotally receive the rollers, and two outer plates fixed to the respective rollers and respectively positioned at external sides of the first inner plate. Wherein, two spacers are respectively disposed at both peripheries of the aperture on the first inner plate and annularly disposed on the rollers so as to block a leakage of a lubricant distributed over an interstice formed between each roller and each aperture. Therefore, the inner plates and the rollers preferably avert from abrasion and rustiness, and the using life of the leaf chain could be prolonged.

The advantages of the present invention over the known prior arts will become more apparent to those of ordinary skilled in the art upon reading the following descriptions in junction with the accompanying drawings.

BRIEF DESCRIPTION OF THE DRAWINGS

FIG. 6 is a cross-sectional view showing a fourth preferred embodiment of the present invention;

FIG. 7 is a cross-sectional view showing a fifth preferred embodiment of the present invention; and FIG. 8 is a cross-sectional view showing the spacer of the fifth preferred embodiment of the present invention.

DETAILED DESCRIPTION OF THE PREFERRED EMBODIMENTS

Figure 1:
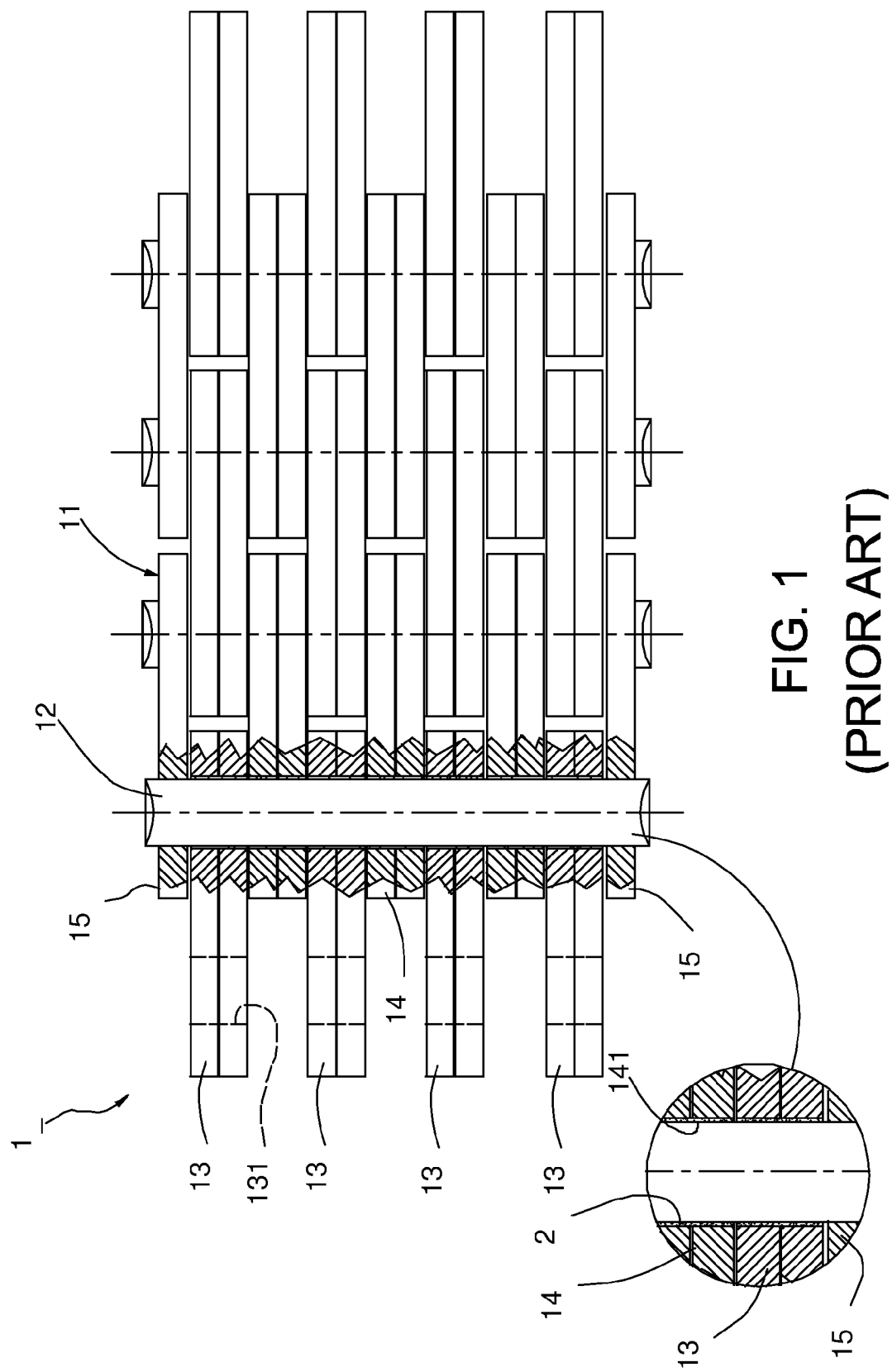
FIG. 1 is a cross-sectional view showing a conventional leaf chain.

Before the present invention is described in greater detail, it should be noted that the like elements are denoted by the similar reference numerals throughout the disclosure.

Figure 2:
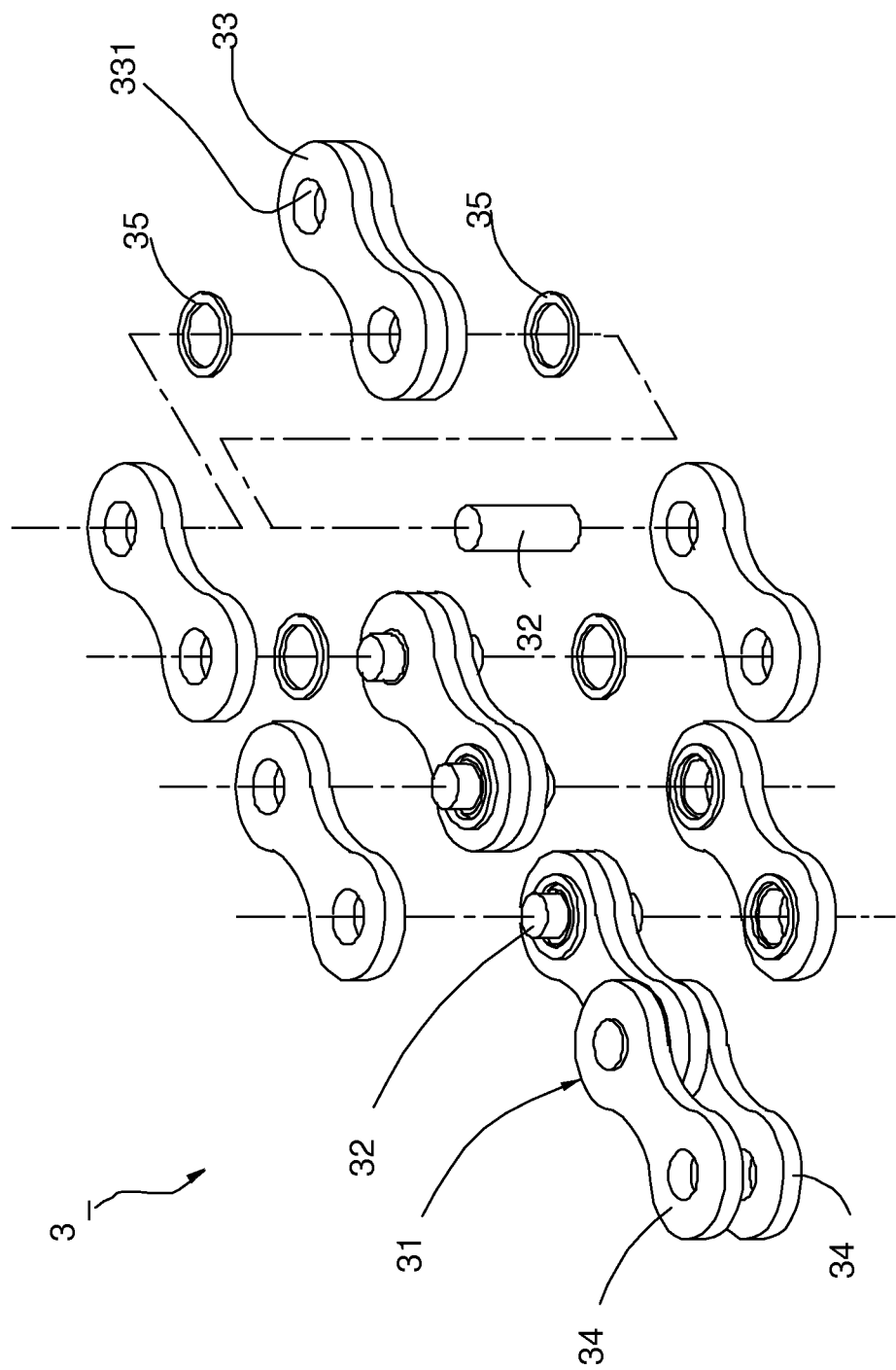
FIG. 2 is a perspective and exploded view showing a first preferred embodiment of the present invention.
Figure 3:
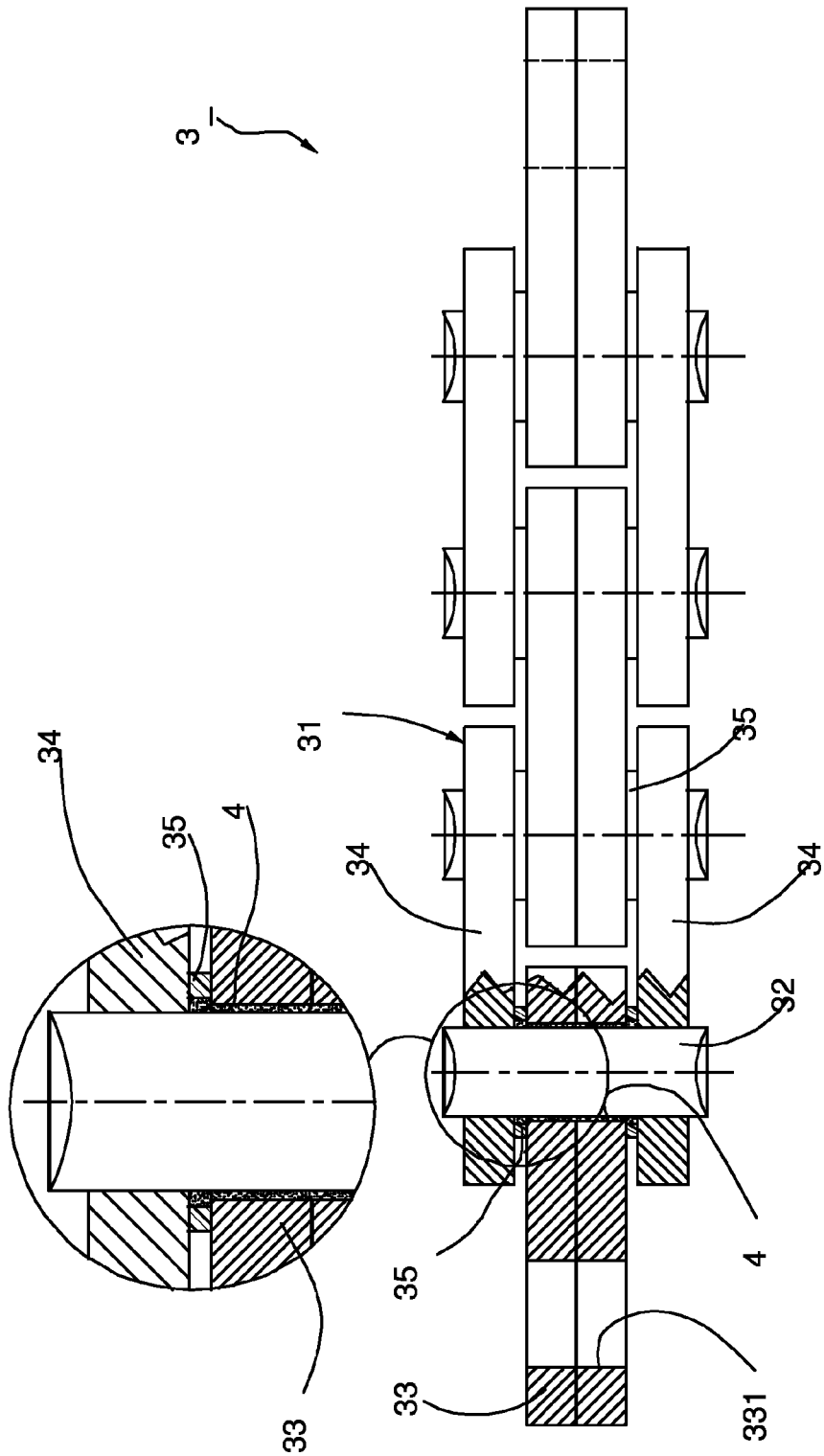
FIG. 3 is a cross-sectional view showing the first embodiment of the present invention.

Referring to FIGS. 2 and 3, a leaf chain 3 of a first preferred embodiment of the present invention comprises a plurality of links 31 connected together, each of which includes two aligned rollers 32, at least one first inner plate 33 pivotally disposed on the rollers 32, and two outer plates 34 fixed to the respective rollers 32 and positioned at the external surfaces of the first inner plate 33. Wherein, a plurality of first apertures 331 defined on the first inner plate 33 that pivotally joints the roller 32 would be penetrated by the rollers 32. Moreover, a lubricant 4 is added within an interstice formed between each roller 32 and each aperture 331.

Figure 4:
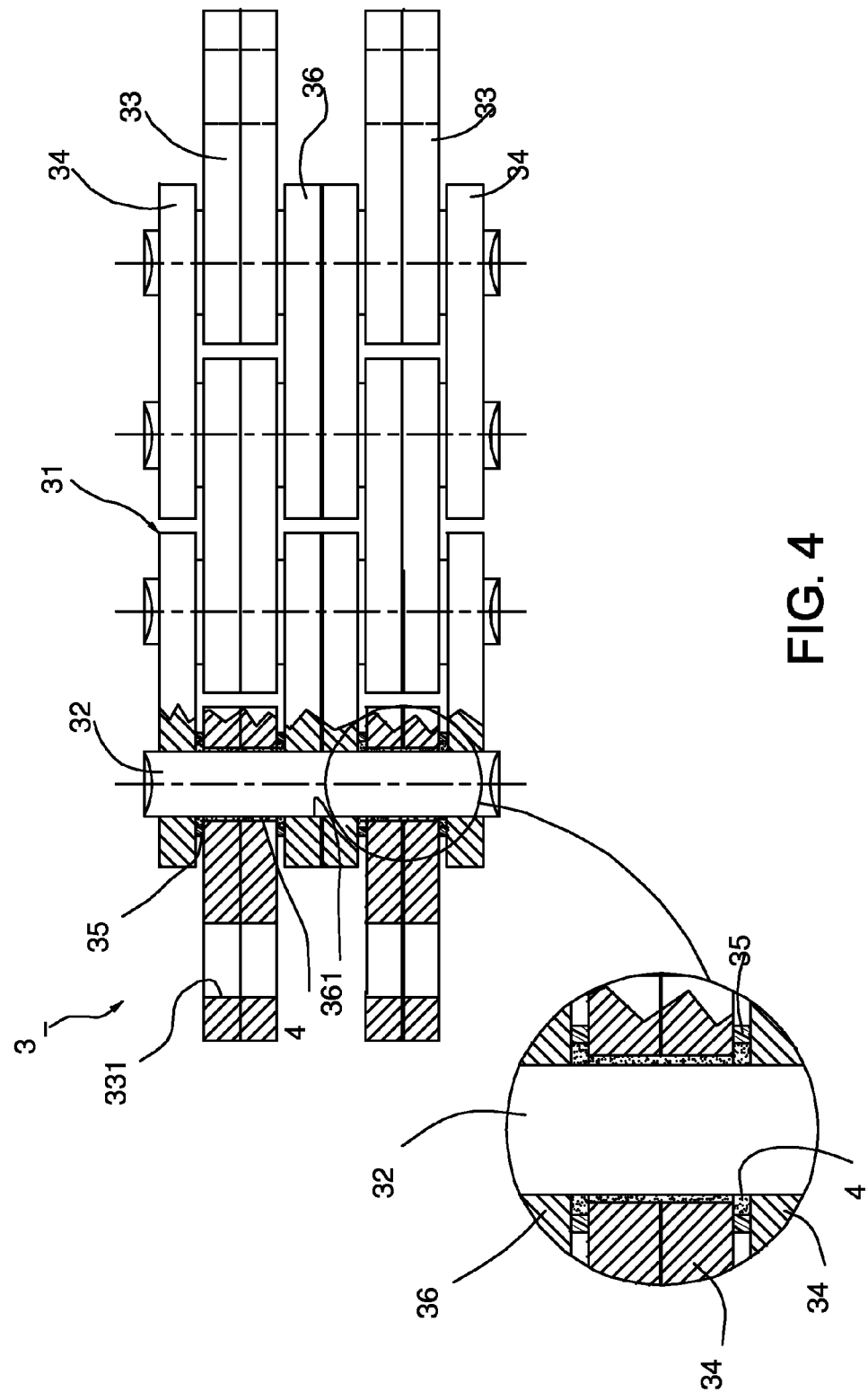
FIG. 4 is a cross-sectional view showing a second preferred embodiment of the present invention.

Continuing with the aforementioned, a spacer 35 is disposed between the outer plate 34 and the first inner plate 33 as well as annularly disposed on each of the rollers 32. Wherein, the material of the spacer 35 could adopt an elastic material, e.g. rubber, so that the spacer 35 could cover and seal the periphery of the aperture 331 for preventing the lubricant 4 contained therein from leaking. Moreover, when the first inner plate 33 adopts a plurality, a second inner plate 36 correspondingly disposed to the outer plates 34 is further disposed between any two of the first inner plates 33. Wherein, the second inner plates 36 have second apertures 361 including peripheries thereof densely engaged with the rollers 32. As it should be, the number of the first inner plate 33 could be alternatively adjusted according to the practical application. For example, the first inner plates 33 set two abreast may be adopted by a second preferred embodiment shown in FIG. 4, or the first inner plates 33 set four abreast may also be adopted by a third preferred embodiment shown in FIG. 5. Herein the four first inner plates 33 are described as follows.

Figure 5:
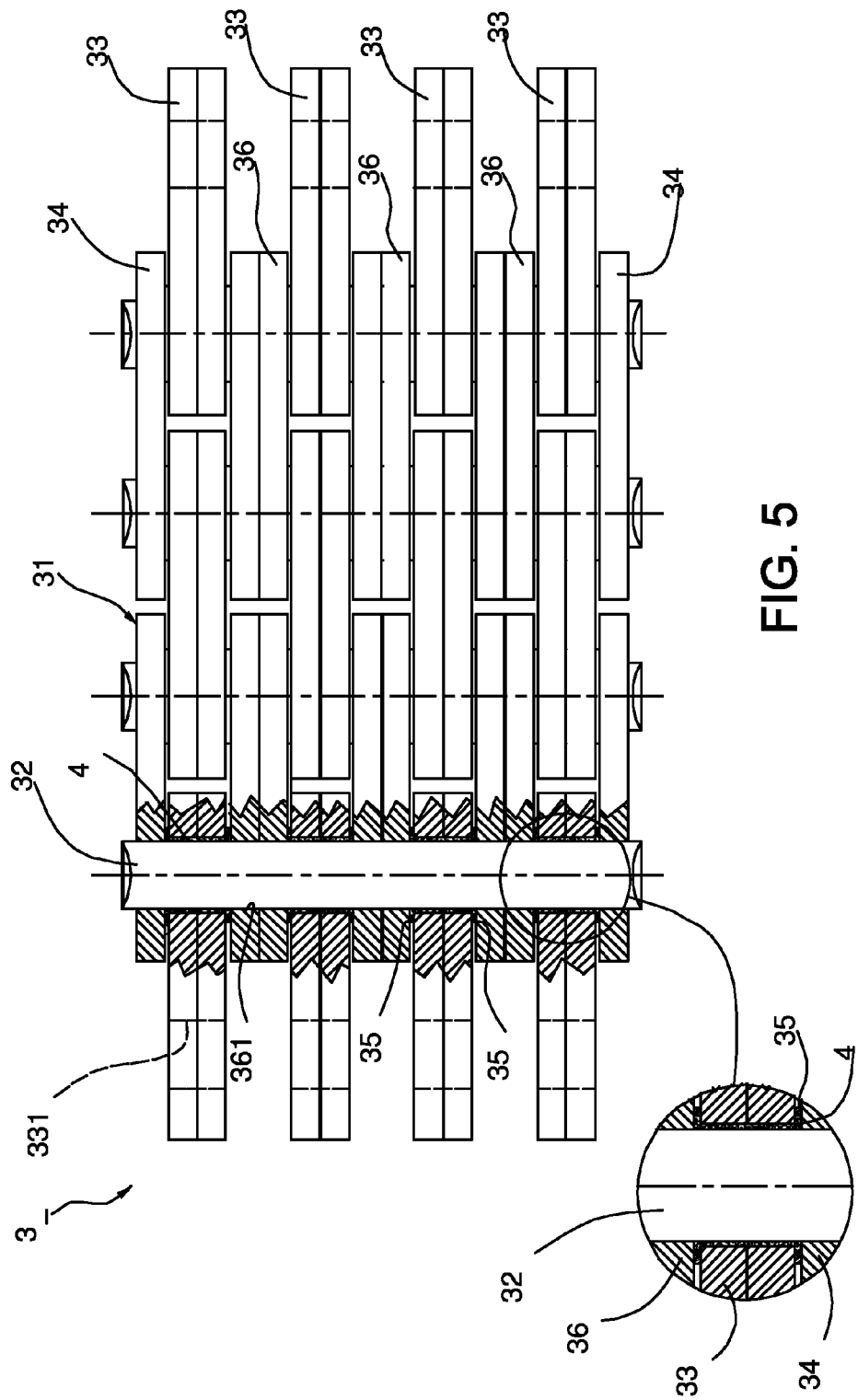
FIG. 5 is a cross-sectional view of a third preferred embodiment of the present invention.

Referring to FIG. 5, while operating the leaf chain 3, the spacer 35 prevents the outer plate 34, the first and the second inner plates 33, 36 from a direct abrasion. Moreover, a periphery of the aperture 331 of the first inner plate 33 would be firmly sealed, and the lubricant 4 would not ooze from the interstice formed between the first inner plate 33 and the roller 32. Therefore, the components contained in the leaf chain 3 would possess a preferable lubricating efficiency for providing a more stable transmission, and the first inner plate 33 as well as the roller 32 would not be subjected to wear during the operation. Moreover, since the second inner plate 36 densely engages with the roller 32, a connective force originally provided merely by the outer plates 34 and the rollers 32 would now be enhanced. As a result, the roller 32 would not be forcedly rotated on the outer plate 34 while the loading is high, and both of the outer plate 34 and the roller 32 would not be worn away, so that the using life of the leaf chain 3 could be extended.

Referring to FIG. 6, a fourth preferred embodiment of the present invention comprising alike elements as those of the third preferred embodiment are herein omitted. Wherein, a sleeve 37 is disposed on each of the rollers 32 and penetrated by the first apertures 331. Wherein, the sleeve 37 is formed by die-casting with powder metallurgy and oil; whereby, the sleeve 37 would preferably possess the lubricating performance. As it should be, the sleeve 37 could be alternatively treated by a carburization and heat treatment to reinforce the hardness thereof, so that the sleeve 37 could be averted from the abrasion well. By means of the cooperation of the lubricant (not shown) and the sleeve 37, a contacting surface of the first inner plate 33 abutting on the roller 32 could be smooth to decrease the relationship of the mutual abrading. Therefore, the serving life of the leaf chain 3 is also prolonged.

Referring to FIG. 7, a fifth preferred embodiment of the present invention comprising alike elements as those of the third preferred embodiment are herein omitted. Wherein, two indentations 332 are respectively defined on the borders of the aperture 331 on the first inner plate 33 for placing the spacer 35 therein. Further referring to FIG. 8, a cross-section of the spacer 35 shows a cambered face 351 and a plane face 352 formed oppositely. Preferably, the plane face 352 is placed against the indentation 332, and the cambered face 351 is placed against the outer plate 34. Alternatively, the indentation 332 could be defined on the outer plate 34, while the cambered face 351 is placed against the first inner plate 33. Briefly, the plane face 352 would keep propping against the indentation 332. Herein this embodiment, the indentation 332 is defined on the first inner plate 33. By means of the indentation 332, the first inner plate 33 would not directly rub against the outer plate 34, so that the leaf chain 3 would not displace from its original position. Moreover, since the cambered face 351 is designed by an arc, a contact area between the spacer 35 and the outer plate 34 could be decreased to prevent a twisting force directly acting on the spacer 35 while both of the first inner plate 33 and the outer plate 34 are twisted. As a result, the spacer 35 would not facilely sustain deformation to affect the sealing efficiency thereof, and the lubricant 4 received within the first inner plate 33 and the roller 32 could be well preserved for attaining a preferable lubricating capability.

To sum up, the present invention takes advantages of a spacer being respectively provided at the apertures on the first inner plate included by each link. Firmly covering the apertures, the spacer impedes the friction from the first inner plate against the outer plate, and a lubricant within the inner plate and the roller could be well preserved to be excluded from a leakage during the operation. Therefore, a preferable lubricating efficiency is achieved, and a serious worn-out condition is lessened to favorably extend the serving life of the leaf chain.

While we have shown and described the embodiment in accordance with the present invention, it should be clear to those skilled in the art that further embodiments may be made without departing from the scope of the present invention.

I claim:

1. A leaf chain comprising
a plurality of links connected together, each of which includes two aligned rollers,
a plurality of sets of inner plates, each of said sets of inner plates containing at least a first inner plate and a second inner plate, said sets of said inner plates being rotationally disposed on said rollers, and two outer plates rotatably fixed to said respective rollers and positioned on opposing ends of said plurality of sets of inner plates;
a plurality of first apertures formed through all of said first and second inner plates and said outer plates where an outer surface of one of the rollers contacts an inner surface of one of the plurality of first apertures;
a lubricant being added within an interstice formed between each roller and each aperture;
a plurality of spacers being respectively disposed at both peripheries of said aperture each of said spacers being positioned between adjacent sets of said inner plates and at least two spacers positioned between said two outer plates and a respective one of said sets of said inner plates and said spacers annularly disposed on said rollers for blocking a leakage of said lubricant.

2. The leaf chain as claimed in claim 1, wherein, a sleeve is disposed on each of said rollers for penetrating said plurality of first apertures.

3. The leaf chain as claimed in claim 2, wherein, said sleeve is formed by die-casting with powder metallurgy and oil.

4. The leaf chain as claimed in claim 1, wherein, said plurality of sets of inner plates have second apertures including peripheries thereof densely engaged with said rollers.

5. The leaf chain as claimed in claim 1, a cross-section of said spacer shows a cambered face and a plane face formed oppositely.

6. The leaf chain as claimed in claim 1, wherein, two indentations are respectively defined on the borders of said first apertures on said first inner plates for placing said spacer therein.

* * * * *